(12) United States Patent
Sadano et al.

(10) Patent No.: US 7,658,404 B2
(45) Date of Patent: Feb. 9, 2010

(54) INSTRUMENT PANEL STRUCTURE WITH AIRBAG UNIT

(75) Inventors: Masato Sadano, Hiroshima (JP); Mitsutoshi Yamanishi, Hiroshima (JP)

(73) Assignee: Mazda Motor Corporation (JP)

( * ) Notice: Subject to any disclaimer, the term of this patent is extended or adjusted under 35 U.S.C. 154(b) by 124 days.

(21) Appl. No.: 11/635,493

(22) Filed: Dec. 8, 2006

(65) Prior Publication Data

US 2007/0145728 A1   Jun. 28, 2007

(30) Foreign Application Priority Data

Dec. 22, 2005   (JP) .............................. 2005-370640

(51) Int. Cl.
*B60R 21/205* (2006.01)
(52) U.S. Cl. .................... 280/732; 280/728.2
(58) Field of Classification Search ............. 280/728.2, 280/730.1, 732, 736, 743.1
See application file for complete search history.

(56) References Cited

U.S. PATENT DOCUMENTS

| 4,893,833 | A  | * | 1/1990  | DiSalvo et al. ............... 280/732 |
| 5,460,401 | A  | * | 10/1995 | Gans et al. ................. 280/728.3 |
| 6,053,527 | A  | * | 4/2000  | Gans et al. ................. 280/728.3 |
| 6,457,738 | B1 | * | 10/2002 | Labrie et al. ............. 280/728.3 |
| 6,955,376 | B1 | * | 10/2005 | Labrie et al. ............. 280/728.3 |
| 7,178,825 | B2 | * | 2/2007  | Fujii et al. ................... 280/732 |
| 2002/0014759 | A1 |   | 2/2002  | Desprez |
| 2002/0027337 | A1 | * | 3/2002  | Shin ........................ 280/728.3 |
| 2004/0075251 | A1 | * | 4/2004  | Fujii et al. ................ 280/728.3 |
| 2005/0167955 | A1 | * | 8/2005  | Gayer et al. .............. 280/728.3 |

FOREIGN PATENT DOCUMENTS

| DE | 19940984 | 3/2001 |
| EP | 0748722 | 12/1996 |
| EP | 0947396 | 10/1999 |
| EP | 1348601 | 10/2003 |
| EP | 1403148 | 3/2004 |
| FR | 2809692 | 12/2001 |
| JP | 08207621 | 8/1996 |
| JP | 11198752 | 7/1999 |
| JP | 2005-088634 | 4/2005 |
| JP | 2005088634 | 4/2005 |
| JP | 2005-247245 | 9/2005 |
| JP | 2005247245 | 9/2005 |

OTHER PUBLICATIONS

European Search Report Application No. EP 06 02 4152 dated Feb. 2, 2007.

* cited by examiner

*Primary Examiner*—Paul N. Dickson
*Assistant Examiner*—Barry Gooden, Jr.
(74) *Attorney, Agent, or Firm*—Studebaker & Brackett PC; Donald R. Studebaker (57) ABSTRACT

The airbag unit is disposed inside the rear upper face portion of the instrument panel near the difference-in-level portion. The lid portion is configured to open substantially forward around the hinge member without hitting against the difference-in-level portion. Herein, the hinge member is configured such that the lid portion can open beyond the difference-in-level portion to the position where the lid portion is substantially located on the front upper face portion of the instrument panel when the airbag is inflated to its maximum opening state. Accordingly, the proper protection of the passenger seated in the assistant seat can be performed.

22 Claims, 5 Drawing Sheets

INSTRUMENT PANEL STRUCTURE WITH AIRBAG UNIT

BACKGROUND OF THE INVENTION

The present invention relates to an instrument panel structure with an airbag unit, which is provided at a front end portion in a vehicle cabin.

Conventionally, it is well known that an airbag unit with an airbag that is inflated to protect a passenger seated in an assistant seat at a vehicle frontal crash is provided inside an instrument panel that is provided at a front end portion in a vehicle cabin. Herein, the following structure, as disclosed, for example, in Japanese Patent Laid-Open Publication No. 2005-088634, is known. That is, a lid portion is formed on an upper face portion of the instrument panel at a portion corresponding to the airbag unit, wherein the lid-portion is partitioned by a tear line with a groove that is formed on an inside face of the upper portion and configured to open when the tear line is torn by an inflation pressure of the airbag. And, a frame portion is attached to the inside face of the upper portion, wherein the frame portion is configured to enclose an inflation space of the airbag between the airbag unit and the lid portion. Herein, the lid portion is connected to the frame portion via a hinge member at a front end portion of the lid portion. The above-described structure has an advantage of providing a good appearance and a smooth opening of the lid portion. That is, there may be substantially no changes in level, color and the like on the surface of the instrument panel. Further, the lid portion is configured to open, when the tear line is torn by an inflation pressure of the airbag, forward substantially around the hinge member, without any scatter of broken pieces of the lid portion.

Meanwhile, it is known recently, from a designing aspect of the instrument panel, to provide a difference-in-level portion that is formed on the upper face portion of the instrument panel at a central portion of the upper face portion in a vehicle longitudinal direction so as to extend laterally along an entire vehicle width. Herein, a rear portion of the upper portion that is located in back of the difference-in-level portion is located at a lower level than a front portion of the upper portion that is located in front of the difference-in-level portion. And, some meters and the like are provided at a portion that interconnects the front upper face portion and the rear upper face in front of a driver's seat. Furthermore, it is known that a vertical position of the front upper face portion of the instrument panel is adjustable so that there can be provided a state with some difference-in-level and a flat state with substantially no difference-in-level, as disclosed, for example, in Japanese Patent Laid-Open Publication No. 2005-247245.

Herein, in providing the airbag unit inside the instrument panel with the above-described difference-in-level, there may be a problem of a location of the airbag unit. Namely, in a case where the airbag unit is provided inside the front upper face portion of the instrument panel, the location of the airbag unit would be away from the passenger seated in the assistant seat, so that the inflation timing of the airbag would be somewhat delayed for the passenger. Meanwhile, in a case where the airbag unit is provided at a rear portion inside the rear upper face portion of the instrument panel, the airbag would be inflated so rearward that a front end portion of the airbag would not be inflated properly in a space between a windshield and the upper face portion of the instrument panel. As a result, there would occur a relatively large gap between the front end portion of the airbag and front ends of the windshield or the upper face portion of the instrument panel when the airbag is inflated to its maximum opening state. This gap may cause a forward shift of the inflated airbag by the passenger hitting against the airbag, so that the protection of the passenger by the airbag would be improperly delayed. Although the airbag with a large volume could prevent this delayed protection, such airbag would require an improperly long time for its full inflation instead.

Thus, it may be considered that the airbag unit is provided inside the front end portion (near the difference-in-level portion) of the rear upper face of the instrument panel. Herein, however, there is a concern that the lid portion opening forward would hit against the difference-in-level portion and thereby stop opening further. Accordingly, the front end portion of the airbag would be prevented from opening forward, so that, likewise, there would occur the gap between the front end portion of the airbag and front ends of the windshield or the upper face portion of the instrument panel when the airbag is inflated to its maximum opening state, which would delay the protection of the passenger by the airbag improperly. There is also a concern that the lid portion would be broken and pieces of the broken lid portion would scatter.

SUMMARY OF THE INVENTION

The present invention has been devised in view of the above-described problems, and an object of the present invention is to provide an instrument panel structure with an airbag unit that can perform a proper protection of the passenger seated in the assistant seat.

According to the present invention, there is provided an instrument panel structure with an airbag unit, which is provided at a front end portion in a vehicle cabin, wherein a difference-in-level portion is formed on an upper face portion of an instrument panel, which is located below a windshield, at substantially a central portion of the upper face portion in a vehicle longitudinal direction, a rear portion of the upper portion that is located in back of the difference-in-level portion is located at a lower level than a front portion of the upper portion that is located in front of the difference-in-level portion, the airbag unit comprises an inflatable airbag and is provided inside the rear upper face portion near the difference-in-level portion, a lid portion is formed on the rear upper face portion at a portion corresponding to the airbag unit, the lid portion being partitioned by a tear line with a groove that is formed on an inside face of the rear upper portion and configured to open when the tear line is torn by an inflation pressure of the airbag, the airbag is configured to be inflated outside the instrument panel through an opening formed with the lid portion opening, a frame portion is attached to the inside face of the rear upper portion, the frame portion being configured to enclose an inflation space of the airbag between the airbag unit and the lid portion, the lid portion is connected to the frame portion via a hinge member at a front end portion of the lid portion, the lid portion being configured to open substantially forward substantially around the hinge member, and the hinge member is configured such that the lid portion can open beyond the difference-in-level portion to a position where the lid portion is substantially located on the front upper face portion of the instrument panel when the airbag is inflated to its maximum opening state.

According to the above-described structure, when the airbag is inflated by the operation of the airbag unit at the vehicle frontal crash, the tear line is torn by the inflation pressure of the airbag and then the lid portion opens forward substantially around the hinge member. Since the lid portion opens beyond the difference-in-level portion to the position where the lid portion is substantially located on the front upper face portion of the instrument panel when the airbag is inflated to its maximum opening state, the front end portion of the airbag can be inflated properly in the space between the windshield and the upper face portion of the instrument panel. Namely, the lid portion opens without hitting against the difference-in-level portion and with smoothly rotating beyond the difference-in-level portion, and then substantially an entire part of the outside face of the lid portion contacts the outside face of the front upper face portion of the instrument panel eventually. Accordingly, the front end portion of the airbag can be inflated properly in the space between the windshield and the upper face portion of the instrument panel without the prevention by the lid portion. Thereby, the improper forward shift of the inflated airbag by the passenger hitting against the airbag can be prevented and thus the proper protection of the passenger can be performed.

According to an embodiment of the present invention, the hinge member is configured to expand substantially straight from its original curved shape with the inflation pressure of the airbag, when viewed from the side of the vehicle, according to opening of the lid portion, whereby the lid portion can open beyond the difference-in-level portion to the position where the lid portion is substantially located on the front upper face portion of the instrument panel when the airbag is inflated to its maximum opening state.

Also, according to another embodiment of the present invention, the original curved shape of the hinge member is configured to be substantially U shape, when viewed from the side of the vehicle.

Further, according to another embodiment of the present invention, wherein the hinge member is configured to expand from its frame-portion connecting-portion side toward its lid-portion connecting-portion side with the inflation pressure of the airbag according to opening of the lid portion, whereby the lid portion can open beyond the difference-in-level portion to the position where the lid portion is substantially located on the front upper face portion of the instrument panel when the airbag is inflated to its maximum opening state.

According to the above-described embodiments, the hinge member can be accommodated compactly and the above-described forward opening of the lid portion can be achieved surely and easily.

According to further another embodiment of the present invention, the hinge member is made from thermoplastic olefin.

Accordingly, the expansion of the hinge member can be provided to a proper extent, so the above-described function and effect of the present invention can be performed more properly.

According to further another embodiment of the present invention, the airbag unit and the frame portion are configured such that the airbag can be inflated obliquely upward and rearward.

Accordingly, the lid portion is pushed obliquely upward and rearward by the operation of the airbag at an initial stage, so hitting of the lid portion at a stage where the hinge member has not expanded fully can be surely prevented.

According to further another embodiment of the present invention, the difference-in-level portion comprises a connecting portion that interconnects a rear end of the front upper face portion and a front end of the rear upper face portion of the instrument panel, the connecting portion is formed in a recess shape in such a manner that the rear end of the front upper face portion is located rearward relative to the front end of the rear upper face portion, and an indication portion, which is directed to a passenger side, is provided at the connecting portion.

Accordingly, since the indication portion is positioned at relatively a high level portion of the instrument panel, the proper visibility of the indication portion can be provided. Also, since the indication portion is provided at the recessed connecting portion, the lid portion can be surely prevented from hitting against the indication portion. Thus, any breakage of the indication portion or any scatter of broken pieces of the indication portion can be properly prevented.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Figure 1:
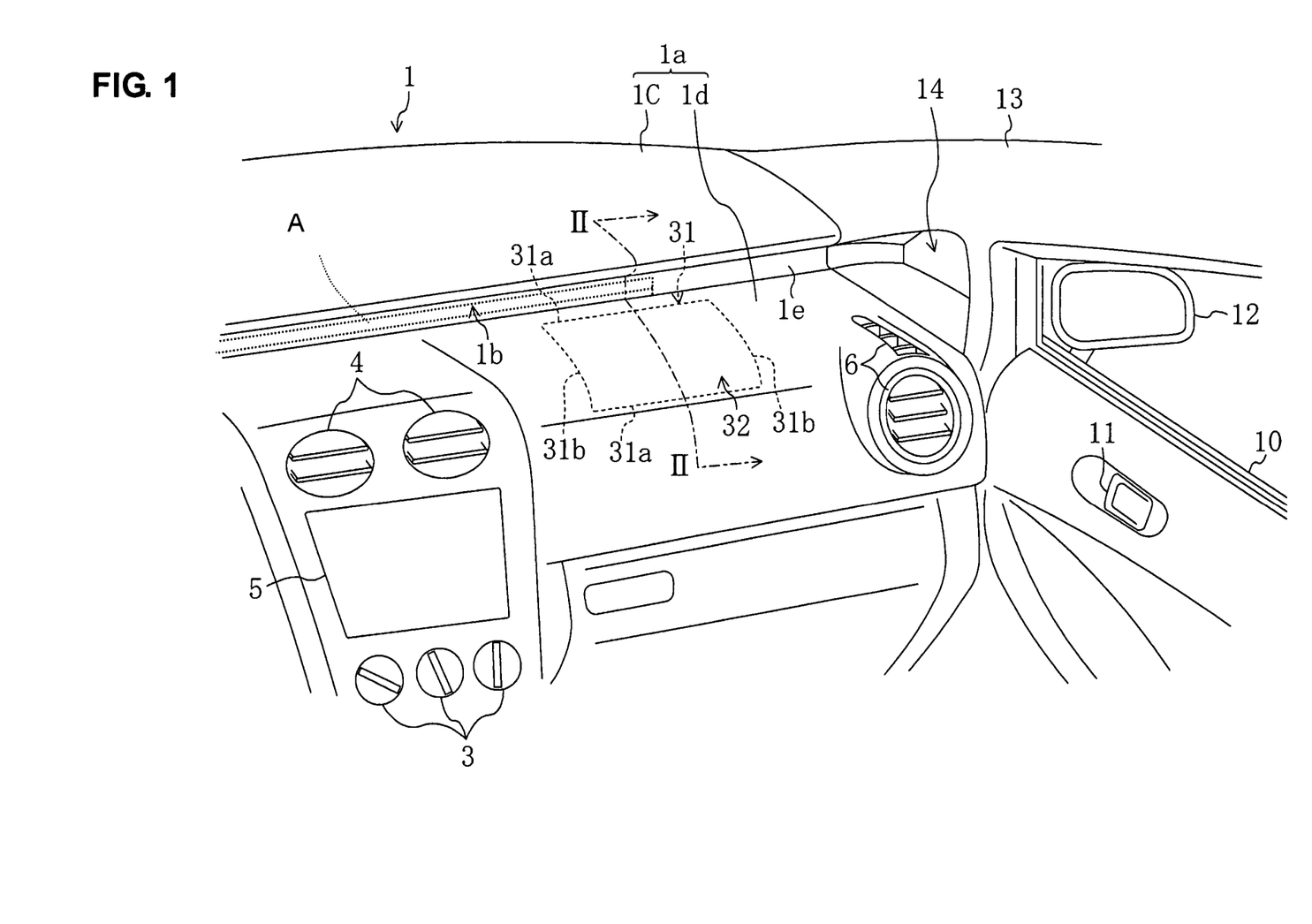
FIG. 1 is a perspective view of a front end portion of a vehicle cabin on an assistant seat side of a vehicle with an instrument panel structure according to an embodiment of the present invention.
Figure 2:
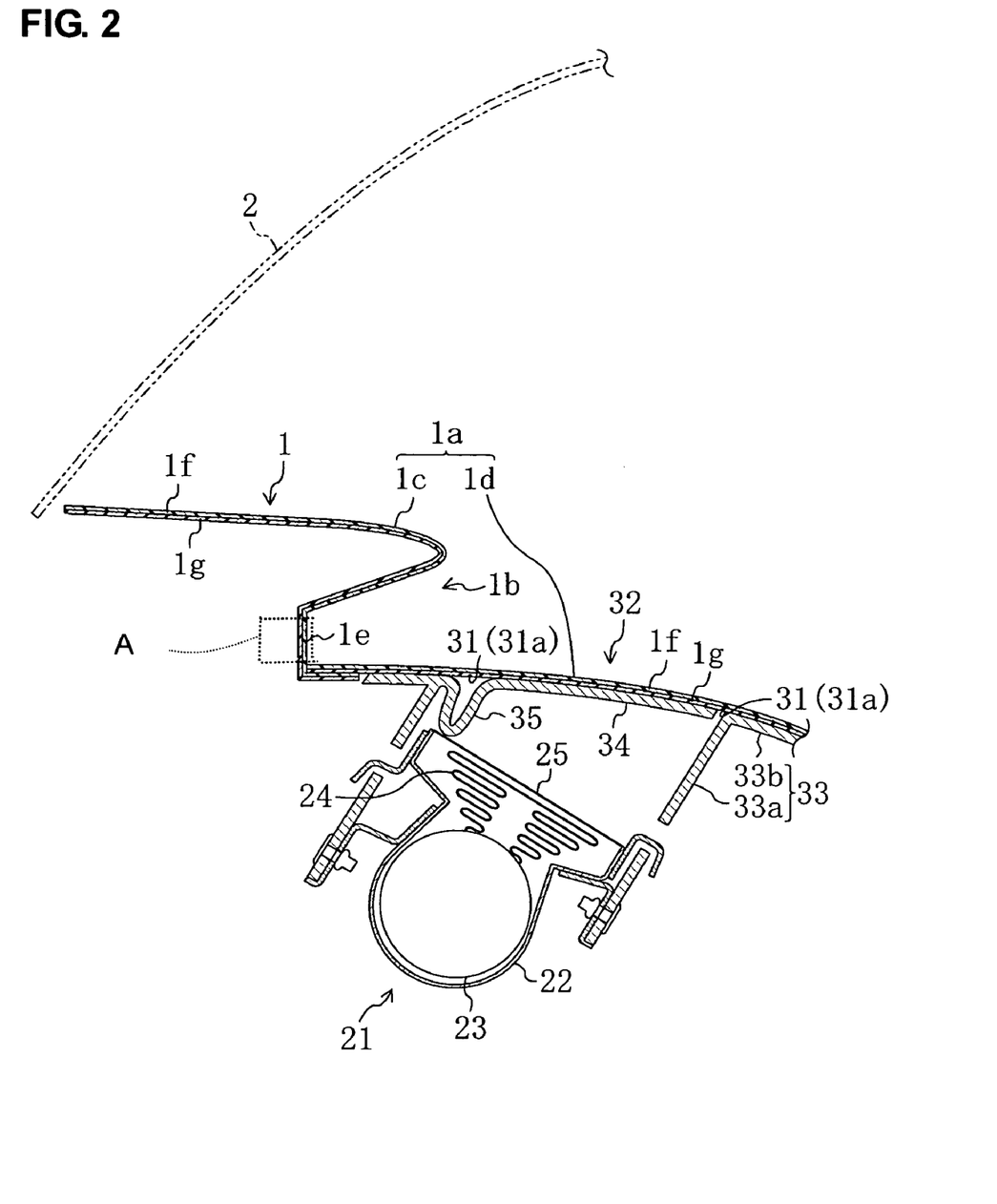
FIG. 2 is a sectional view taken along line II-II of FIG. 1.

FIG. 1 is a perspective view of a front end portion of a vehicle cabin on an assistant seat side of a vehicle (with a left-positioned steering wheel) with an instrument panel structure according to an embodiment of the present invention, and FIG. 2 is a sectional view taken along line II-II of FIG. 1. A difference-in-level portion 1b is formed on an upper face portion 1a of an instrument panel 1, which is located below a windshield 2, at substantially a central portion of the upper face portion 1a in a vehicle longitudinal direction. A rear portion 1d of the upper portion 1a that is located in back of the difference-in-level portion 1b is located at a lower level than a front portion 1c of the upper portion 1a that is located in front of the difference-in-level portion 1b. In the present embodiment, a vertical distance (namely, a height of the difference-in-level portion 1b) between the a rear end of the front upper face portion 1c and a front end of the rear upper face portion 1d is set to be in a rage of 3 to 7 cm.

The instrument panel 1 comprises an outer layer 1f that is made from thermoplastic olefin, which may improve appearance, and an inner layer 1g that is made from propylene, which may provide a high rigidity. Thus, the instrument panel 1 can ensure a sufficient rigidity and an improved outer appearance.

At a central portion of a rearward face (front face) of the instrument panel 1 are provided some operational switches 3 for adjusting temperature and air flow amount and the like, center ventilators 4, and a display 5 for indicating various information. At the rear upper face portion 1d and an end rear portion on the assistant seat side (on the right side) is provided a side ventilator 6 for supplying conditioning air. In FIG. 1, a side door on the assistant seat side is denoted by a reference numeral 10, an inner door handle for opening the side door 10 is denoted by a reference numeral 11, a side mirror on the side door 10 is denoted by a reference numeral 12, a front pillar is denoted by a reference numeral 13, and a triangle window is denoted by a reference numeral 14.

A connecting portion 1e that interconnects the front upper face portion 1c and the rear upper face 1d of the instrument panel 1 at the difference-in-level portion 1b is configured in such a manner that it extends obliquely downward and forward from the rear end of the front upper face portion 1c and then downward almost vertically, and finally connects with a front end of the rear upper face 1d. Thereby, a lower portion of the connecting portion 1e is recessed, and the front end of the rear upper face portion 1d is located forward relative to the rear end of the front upper face portion 1c.

Herein, an indication portion A may be provided at the connecting portion 1e (see FIGS. 1 and 2). Thus, since the indication portion A is positioned at relatively a high level portion of the instrument panel 1, the proper visibility of the indication portion A can be provided.

An airbag unit 21 is provided inside the instrument panel 1 on the side of an assistant seat, which protects a passenger seated in the assistant seat at the vehicle frontal crash. The airbag unit 21 comprises a case 22 with an opening portion, an inflator 23 provided inside the case 22, and an inflatable airbag 24 that is placed in a folded state at the opening portion of the case 22 and inflated by gas supplied from the inflator 23 at the vehicle frontal crash. The case 22 is fixed to an instrument panel member, not illustrated, via a bracket, not illustrated, and attached to a frame portion 33, which will be described below. Herein, the opening portion of the case 22 is covered initially with a closing member 25 which is made from paper. The closing member 25 is broken by an inflation pressure of the airbag 24.

The airbag unit 21 is disposed inside the rear upper face portion 1d of the instrument panel 1 near the difference-in-level portion 1b in such a manner that the opening portion of the case 22 is directed obliquely upward and rearward. And, a lid portion 32 is formed on the rear upper face portion 1d at a portion corresponding to the airbag unit 21 (at a portion facing the opening portion of the case 22). The lid portion 32 is partitioned by a tear line 31 with substantially a V-shaped groove that is formed on an inside face (a face of the inner layer 1g that is on an opposite side to the outer layer 1f) of the rear upper portion 1d and configured to open when the tear line 31 is torn by the inflation pressure of the airbag 24. The tear line 31, as shown in FIG. 1, is formed in substantially a rectangular shape in a plan view, which comprises a pair of long side portions 31a, 31a extending in a vehicle longitudinal direction and a pair of short side portions 31b, 31b extending in the vehicle width direction. The front side portion 31a is located almost at the same position as the rear end of the front upper face portion 1c in the vehicle longitudinal direction. The airbag 24 is inflated outside the instrument panel 1 through an opening that is formed when the lid portion 32 opens. Herein, the above-described tear line is not formed on the outer face of the instrument panel 1, which provides a so-called seamless structure.

A frame portion 33 is attached to the inside face of the rear upper portion 1d of the instrument panel 1. This frame portion 33 is configured to enclose an inflation space of the airbag 24 between the airbag unit 21 and the lid portion 32. The frame portion 33 is made from thermoplastic olefin and comprises a frame body portion 33a that is of a rectangular shape having substantially the same crosses-section size as the lid portion 32 and a flange portion 33b that is formed at an outer periphery of a lid-portion-side end of the frame body portion 33a. This flange portion 33b is fixed to the inside face of the rear upper face portion 1d of the instrument panel 1 by welding.

The frame body portion 33a extends along the direction of the opening portion of the case 22, whereby the airbag can be inflated obliquely upward and rearward. Thus, the airbag unit 21 and the frame portion 33 are provided in such a manner that the airbag 24 is inflated obliquely upward and rearward.

To the inside face of the lid portion 32 is fixed by welding a back plate 34 that is made from thermoplastic olefin, like the frame portion 33. Herein, a gap is formed around an entire periphery between an outer periphery of the back plate 34 and an inner peripheral portion of the body portion 33a of the frame portion 33. A front end portion of the back plate 34 and a front portion of the inner peripheral face of the frame body portion 33a are connected by a hinge member 35 that is formed in a curved shape, substantially a U shape, when viewed from the side of the vehicle. Thus, the lid portion 32 is connected to the frame portion 33 at its front portion via the hinge member 35. The hinge member 35 is made from thermoplastic olefin, like the frame portion 33 and back plate 34, and in the present embodiment, these portions 33, 34 and 35 are formed integrally. Herein, these portions may be formed from another material. It is preferable that the frame portion 33 and back plate 34 be made from a relatively hard material like polypropylene or the like, while it is preferable that the hinge member 35 be made of a relatively soft material like thermoplastic olefin to have a proper expansion function, which will be described below.

The lid portion 32 is configured to open substantially forward substantially around the hinge member 35 with the tear line 31 being torn by the inflation pressure of the airbag 24. And, the hinge member 35 is configured such that the lid portion 32 can open beyond the difference-in-level portion 1b to a position where the lid portion 32 is substantially located on the front upper face portion 1c of the instrument panel 1 when the airbag 24 is inflated to its maximum opening state. Namely, the hinge member 35 is configured to expand substantially straight from its original U-shaped curved shape and from its frame-portion connecting-portion side toward its lid-portion connecting-portion side with the inflation pressure of the airbag 24 according to opening of the lid portion 32 (in such a manner that the length of the hinge member 35 increases). And, the hinge member 35 is configured to expand to its length that is grater than the height of the difference-in-level 1b when the airbag 24 is inflated to its maximum opening state. Thereby, the lid portion 32 opens without hitting against the difference-in-level portion 1b (especially, the upper end of the connecting portion 1e) and with smoothly rotating beyond the difference-in-level portion 1b, and then substantially an entire part or a part of the outside face of the lid portion 32 contacts the outside face of the front upper face portion 1c of the instrument panel 1 eventually (see FIG. 3).

Figure 3:
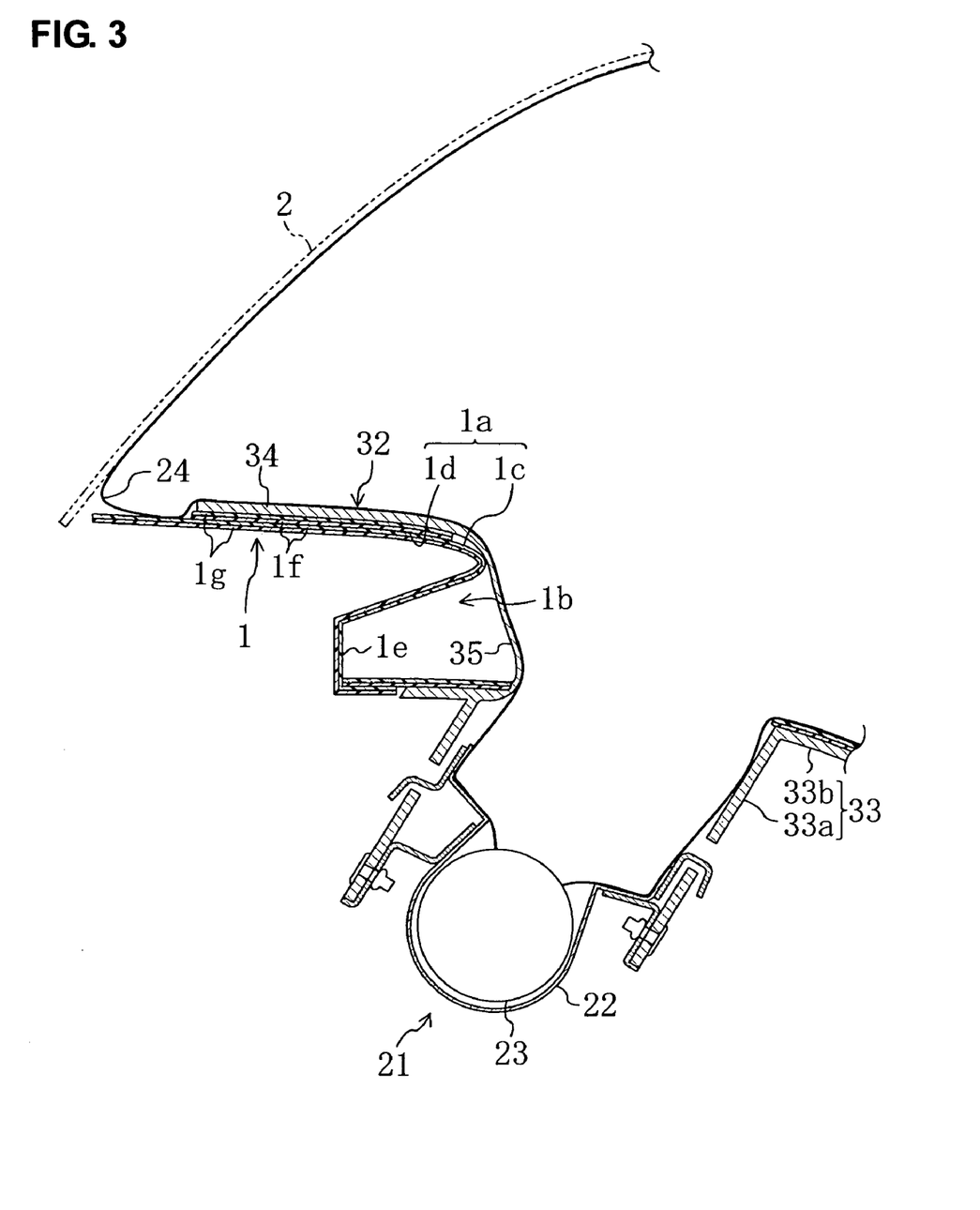
FIG. 3 is a view of an airbag of an airbag unit that is inflated to its maximum opening state, which corresponds to FIG. 2.

Accordingly, since the lid portion 32 does not hit against the difference-in-level portion 1b, the front end portion of the airbag 24 can be inflated forward and properly in the space between the windshield 2 and the upper face portion 1a of the instrument panel 1 without the prevention by the lid portion 32 (see FIG. 3). Meanwhile, in a case where the hinge member 35 does not expand properly, there is a concern that the lid portion 32 opening forward would hit against the difference-in-level portion 1b and thereby stop opening further. And then, the front end portion of the airbag 24 would be prevented from opening forward, so that there would occur the gap between the front end portion of the airbag 24 and front ends of the windshield 2 or the upper face portion 1c of the instrument panel 1 when the airbag 24 is inflated to its maximum opening state. This gap may cause a forward shift of the inflated airbag 24 by the passenger hitting against the airbag 24, so that the protection of the passenger by the airbag 24 would be improperly delayed. According to the present embodiment, however, since the front end portion of the airbag 24 is inflated properly in the space between the windshield 2 and the upper face portion 1a of the instrument panel 1 before the passenger hitting against the airbag 24, the improper forward shift of the inflated airbag 24 by the passenger hitting against the airbag 24 can be smoothly prevented and thus the proper protection of the passenger can be performed. And, any scatter of broken pieces of the lid portion 32 can be prevented when the airbag 24 is inflated.

Figure 4:
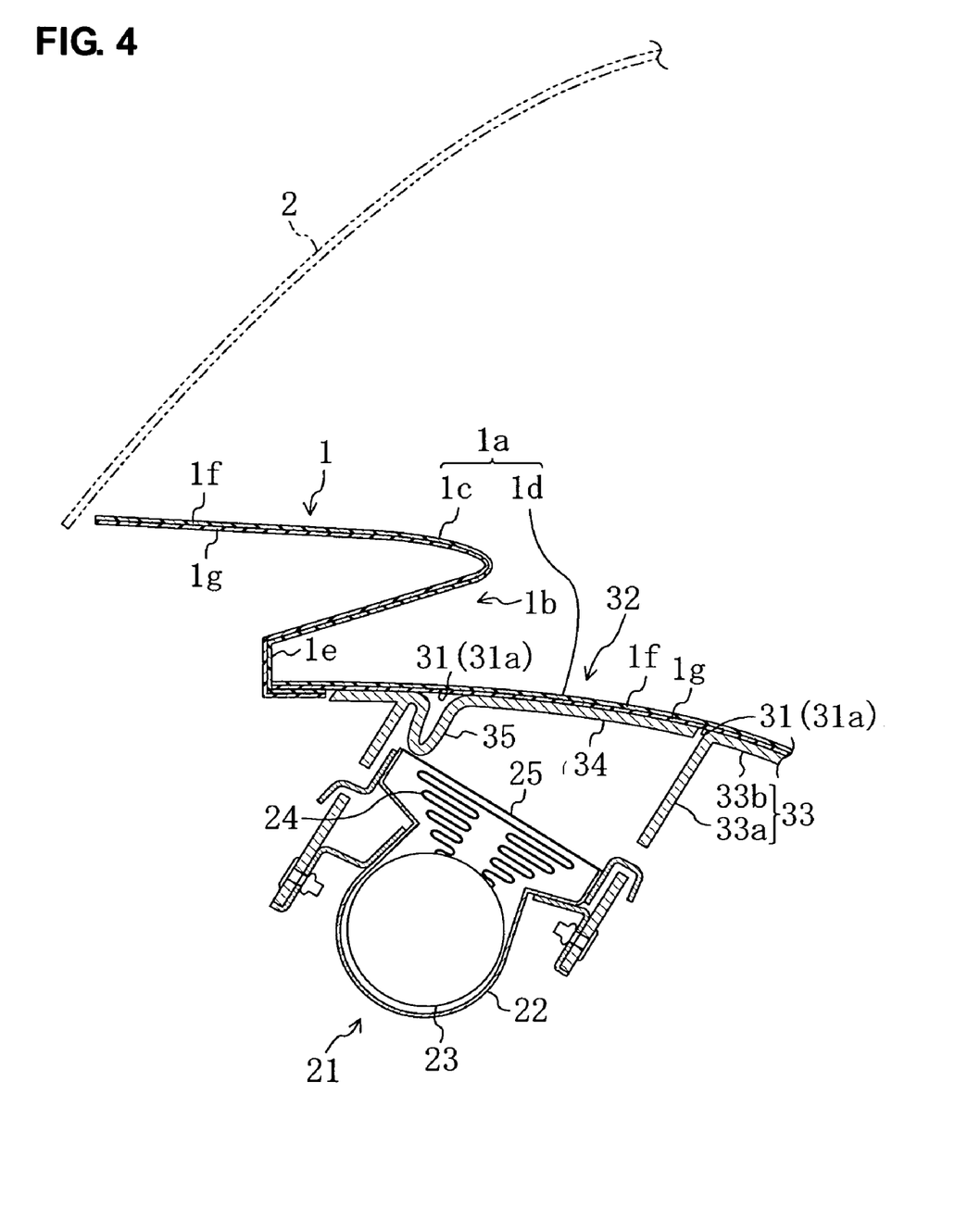
FIG. 4 is a view of another embodiment that adopts a different position of the airbag unit and lid portion, which corresponds to FIG. 2.

Although the front end of the lid portion 32 (the front long side portion 31a of the tear line 31) is located almost at the same position as the rear end of the front upper face portion 1c in the vehicle longitudinal direction in the above-described embodiment, the front end of the lid portion 32 may be located before the rear end of the front upper face portion 1c, and thereby the airbag unit 21 may be disposed further forward, as shown in FIG. 4. Even in this case, since the frame body portion 33a of the frame portion 33 is slant upward and rearward, the lid portion 32 is pushed obliquely upward and rearward by the operation of the airbag 24 at an initial stage, so the lid portion 32 can surely open beyond the difference-in-level 1b without hitting against the difference-in-level 1b.

Also, since the indication portion A is provided at the connecting portion 1e of the difference-in-level 1b, the proper visibility of the indication portion A can be provided. Also, since the indication portion A is provided at this recessed connecting portion 1e, the lid portion 32 can be surely prevented from hitting against the indication portion A. Thus, any breakage of a member (e.g., a transparent cover) of the indication portion A or any scatter of broken pieces of the indication portion A can be prevented.

Figure 5:
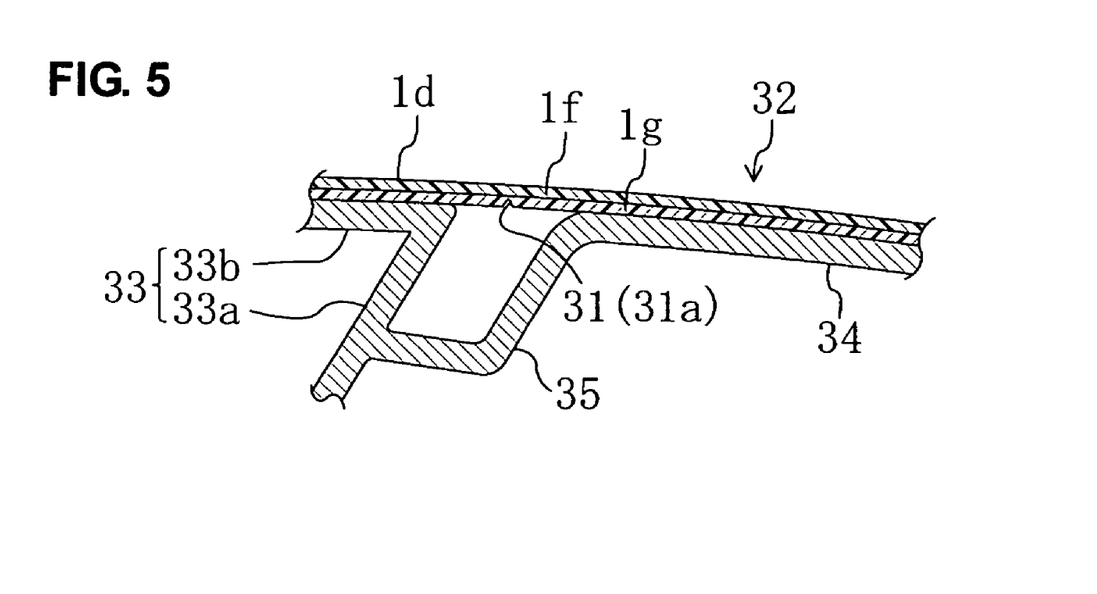
FIG. 5 is an enlarged sectional view of a major portion of another embodiment of a hinge member.
Figure 6:
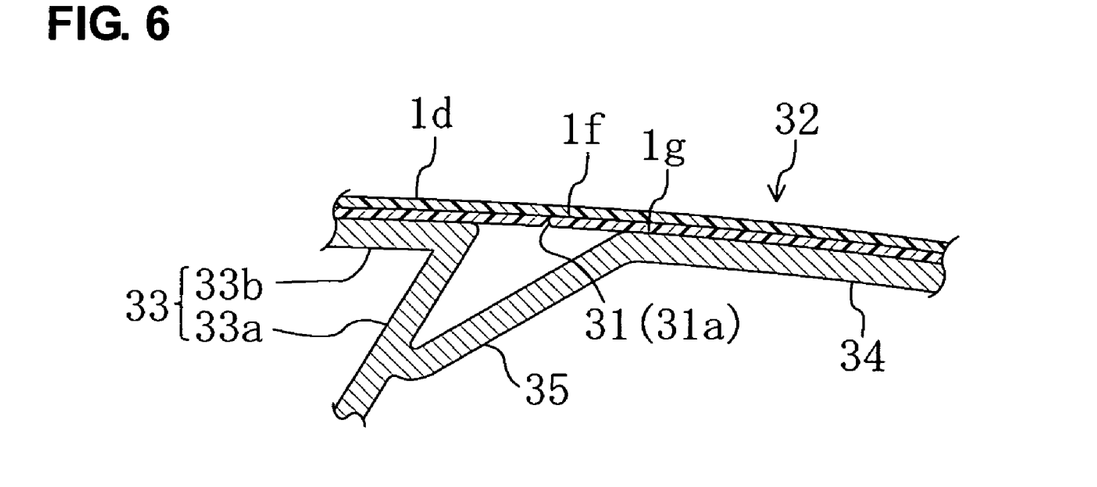
FIG. 6 is an enlarged sectional view of a major portion of further another embodiment of the hinge member.

Further, the hinge member 35 may be formed in any other shape than the substantially U shape. For example, it may be formed in substantially L shape as shown in FIG. 5, or formed in substantially a straight shape such that the hinge member 35 expands from its frame-portion connecting-portion side toward its lid-portion connecting-portion side as shown in FIG. 6 (obliquely upward and rearward in this figure). In the latter case, the hinge member 35 expands in its longitudinal direction according to the opening of the lid portion 32 with the inflation pressure of the airbag 24. Thereby, when the airbag 24 is inflated to its maximum opening state, the lid portion 32 may be substantially located on the front upper face portion 1c beyond the difference-in-level 1b.

Although it is formed as a single member in the present embodiment, the lid portion 32 may be comprised of split parts. For example, the tear line is provided so as to extend laterally at the middle portion of the lid portion 32 (a H-shaped tear line, when viewed from the above), and the lid portion 32 is split into a front part and a rear part when it receives the inflation pressure of the airbag 24. In this case, the front part of lid portion 32 is configured to open via a first hinge member that is connected to the frame portion 33 at the front like the above-described embodiment, and the rear part of the lid portion 32 is configured to open via a second hinge member that is connected to the frame portion 33 at the rear. Herein, the first hinge member can be configured like the hinge member 35 in the present embodiment, so the front part of the lid portion 32 can open beyond the difference-in-level 1b without hitting against the difference-in-level 1b.

The present invention is applicable to the structure shown as Japanese Patent Laid-Open Publication No. 2005-247245, in which the vertical position of the front upper face portion of the instrument panel is adjustable so that there can be provided the state with some difference-in-level and the flat state with substantially no difference-in-level. Herein, the present invention can be applied so as to function in the state with some difference-in-level.

The present invention is especially useful to the instrument panel with the airbag unit, in which the difference-in-level portion is formed on the upper face portion of the instrument panel, which is located below the windshield, at substantially the central portion of the upper face portion in the vehicle longitudinal direction.

The present invention should not be limited to the above-described embodiments, and any other modifications and improvements may be applied within the scope of a sprit of the present invention.

What is claimed is:

1. An instrument panel structure with an airbag unit provided at a front end portion in a vehicle cabin, comprising:
   a difference-in-level portion formed on an upper face portion of an instrument panel and located below a windshield at substantially a central portion of the upper face portion in a vehicle longitudinal direction;
   a rear portion of the upper face portion located in back of the difference-in-level portion and at a lower level than a front portion of the upper face portion located in front of the difference-in-level portion;
   the airbag unit including an inflatable airbag provided inside the rear portion of the upper face portion at a location adjacent to the difference-in-level portion;
   a lid portion formed on the rear portion of the upper face portion at a portion corresponding to the airbag unit, the lid portion being partitioned by a tear line with a groove formed on an inside face of the rear portion of the upper face portion and being opened when the tear line is torn by an inflation pressure of the airbag;
   the airbag being inflatable to an exterior of the instrument panel through an opening formed with the lid portion opening;
   a frame portion attached to the inside face of the rear portion of the upper face portion, the frame portion enclosing an inflation space of the airbag between the airbag unit and the lid portion;
   the lid portion being connected to the frame portion via a hinge member at a front end portion of the lid portion, the lid portion being openable substantially forward around the hinge member; and
   the hinge member being a deformable material and including a substantially U-shaped curved shape open towards a portion of the tear line and having a length configured such that the hinge member expands substantially straight from the curved shape upon receiving the inflation pressure of the airbag during an opening of the lid portion in such a manner that an extent of the hinge member increases, the front portion of the upper face portion of the instrument panel includes an end portion located above said U-shaped curved shape of the hinge member in the vehicle longitudinal direction, wherein the lid portion is openable beyond the difference-in-level portion to a position where the lid portion is substantially located on the front portion of the upper face portion of the instrument panel when the airbag is inflated to a maximum opening state thereof.

2. The instrument panel structure with an airbag unit of claim 1, wherein the hinge member is expandable from a frame-portion connecting-portion side thereof toward a lid-portion connecting-portion side thereof when receiving the inflation pressure of the airbag and thus opening the lid portion, whereby the lid portion is openable beyond the difference-in-level portion to the position where the lid portion is substantially located on the front upper face portion of the instrument panel when the airbag is inflated to the maximum opening state.

3. The instrument panel structure with an airbag unit of claim 2, wherein the hinge member is made from thermoplastic olefin.

4. The instrument panel structure with an airbag unit of claim 1, wherein the hinge member is made from thermoplastic olefin.

5. The instrument panel structure with an airbag unit of claim 1, wherein the airbag unit and the frame portion are such that the airbag is inflatable obliquely upward and rearward.

6. The instrument panel structure with an airbag unit of claim 1, wherein the difference-in-level portion includes a connecting portion that interconnects a rear end of the front portion of the upper face portion and a front end of the rear portion of the upper face portion of the instrument panel, the connecting portion is formed in a recess shape in such a manner that the rear end of the front portion is located rearward relative to the front end of the rear portion, and an indication portion, which is directed to a passenger side, is provided at the connecting portion.

7. The instrument panel structure with an airbag unit of claim 1, wherein the hinge member is expandable to a specified length that is greater than a height of the difference-in-level when the airbag is inflated to the maximum opening state.

8. The instrument panel structure with an airbag unit of claim 1, wherein a front end of the lid portion is located substantially at the same position as a rear end of the front portion of the upper face portion in the vehicle longitudinal direction.

9. The instrument panel structure with an airbag unit of claim 1, wherein a front end of the lid portion is located before a rear end of the front portion of the upper face portion in the vehicle longitudinal direction.

10. The instrument panel structure with an airbag unit of claim 1, wherein the lid portion rotates and opens without hitting against the difference-in-level portion with expansion of the hinge member when the airbag is inflated to the maximum opening state thereof.

11. The instrument panel structure with an airbag unit of claim 1, wherein at least part of the lid portion on the side of the hinge member contacts the front portion of the upper face portion of the instrument panel with expansion of the hinge member when the airbag is inflated to the maximum opening state thereof.

12. An instrument panel structure with an airbag unit provided at a front end portion in a vehicle cabin, comprising:
a difference-in-level portion formed on an upper face portion of an instrument panel and located below a windshield at substantially a central portion of the upper face portion in a vehicle longitudinal direction;
a rear portion of the upper face portion located in back of the difference-in-level portion and at a lower level than a front portion of the upper face portion located in front of the difference-in-level portion;
the airbag unit including an inflatable airbag provided inside the rear portion of the upper face portion at a location adjacent to the difference-in-level portion;
a lid portion formed on the rear portion of the upper face portion at a portion corresponding to the airbag unit, the lid portion being partitioned by a tear line with a groove formed on an inside face of the rear portion of the upper face portion and being opened when the tear line is torn by an inflation pressure of the airbag;
the airbag being inflatable to an exterior of the instrument panel through an opening formed with the lid portion opening;
a frame portion attached to the inside face of the rear portion of the upper face portion, the frame portion enclosing an inflation space of the airbag between the airbag unit and the lid portion;
the lid portion being connected to the frame portion via a hinge member at a front end portion of the lid portion, the lid portion being openable substantially forward around the hinge member; and
the hinge member being a deformable material and including a substantially U-shaped curved shape open towards a portion of the tear line and having a length configured such that the hinge member expands substantially straight from the curved shape upon receiving the inflation pressure of the airbag during an opening of the lid portion in such a manner that an extent of the hinge member increases, wherein the lid portion is openable beyond the difference-in-level portion to a position where the lid portion is located on and contacts the front portion of the upper face portion of the instrument panel when the airbag is inflated to a maximum opening state thereof.

13. The instrument panel structure with an airbag unit of claim 12, wherein the original curved shape of the hinge member is configured to be substantially U shape, when viewed from the side of the vehicle.

14. The instrument panel structure with an airbag unit of claim 12, wherein the hinge member is expandable from a frame-portion connecting-portion side thereof toward a lid-portion connecting-portion side thereof when receiving the inflation pressure of the airbag and thus opening the lid portion, whereby the lid portion is openable beyond the difference-in-level portion to the position where the lid portion is substantially located on the front upper face portion of the instrument panel when the airbag is inflated to the maximum opening state.

15. The instrument panel structure with an airbag unit of claim 14, wherein the hinge member is made from thermoplastic olefin.

16. The instrument panel structure with an airbag unit of claim 12, wherein the airbag unit and the frame portion are such that the airbag is inflatable obliquely upward and rearward.

17. The instrument panel structure with an airbag unit of claim 12, wherein the difference-in-level portion includes a connecting portion that interconnects a rear end of the front portion of the upper face portion and a front end of the rear portion of the upper face portion of the instrument panel, the connecting portion is formed in a recess shape in such a manner that the rear end of the front portion is located rearward relative to the front end of the rear portion, and an indication portion, which is directed to a passenger side, is provided at the connecting portion.

18. The instrument panel structure with an airbag unit of claim 12, wherein the hinge member is expandable to a specified length that is greater than a height of the difference-in-level when the airbag is inflated to the maximum opening state.

19. The instrument panel structure with an airbag unit of claim 12, wherein a front end of the lid portion is located substantially at the same position as a rear end of the front portion of the upper face portion in the vehicle longitudinal direction.

20. The instrument panel structure with an airbag unit of claim 12, wherein a front end of the lid portion is located before a rear end of the front portion of the upper face portion in the vehicle longitudinal direction.

21. The instrument panel structure with an airbag unit of claim 12, wherein the lid portion rotates and opens without hitting against the difference-in-level portion with expansion of the hinge member when the airbag is inflated to the maximum opening state thereof.

22. The instrument panel structure with an airbag unit of claim 12, wherein at least part of the lid portion on the side of the hinge member contacts the front portion of the upper face portion of the instrument panel with expansion of the hinge member when the airbag is inflated to the maximum opening state thereof.

* * * * *